J. N. NEWSOM, H. E. HARDER AND W. F. LESCHEN.
PNEUMATIC VALVE.
APPLICATION FILED JAN. 18, 1919.
1,353,415.
Patented Sept. 21, 1920.
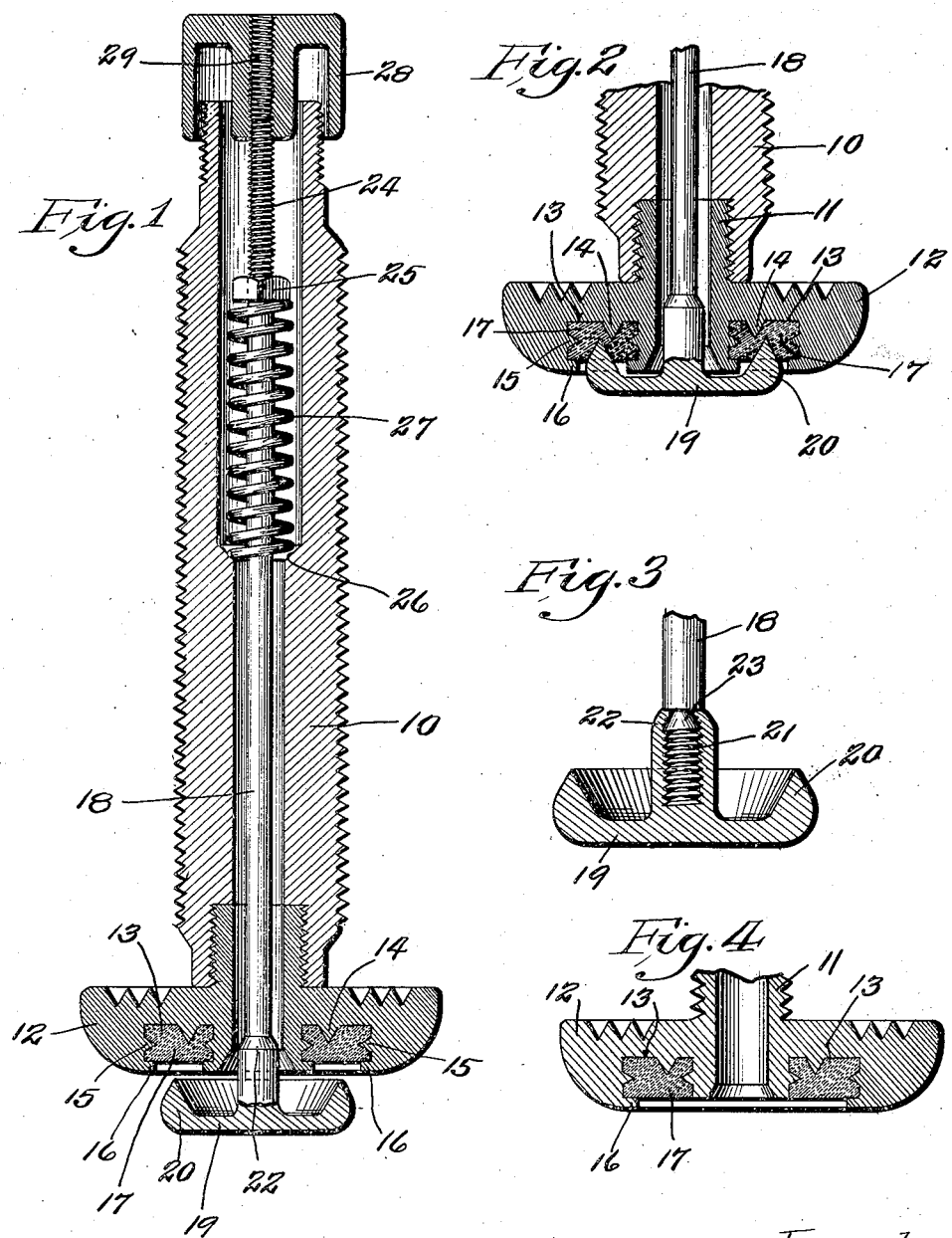
Inventors,
Joseph N. Newsom,
Harry E. Harder,
William F. Leschen,

UNITED STATES PATENT OFFICE.

JOSEPH N. NEWSOM, HARRY E. HARDER, AND WILLIAM F. LESCHEN, OF ST. LOUIS, MISSOURI, ASSIGNORS TO NEWSOM VALVE COMPANY, OF ST. LOUIS, MISSOURI, A CORPORATION OF MISSOURI.

PNEUMATIC VALVE.

1,353,415.      Specification of Letters Patent.      Patented Sept. 21, 1920.

Application filed January 18, 1919. Serial No. 271,796.

*To all whom it may concern:*

Be it known that we, JOSEPH N. NEWSOM, HARRY E. HARDER, and WILLIAM F. LESCHEN, citizens of the United States, residing at St. Louis, Missouri, have invented a certain new and useful Improvement in Pneumatic Valves, of which the following is a full, clear, and exact description, such as will enable others skilled in the art to which it appertains to make and use the same, reference being had to the accompanying drawings, forming part of this specification.

Our invention relates generally to pneumatic valves and more particularly to the type of valve disclosed in United States Letters Patent No. 1,262,239 dated April 9th, 1918, the principal objects of our invention being to generally improve upon and simplify the construction of the valve disclosed in the patent aforesaid, as well as other similar types of valve; to provide a structure wherein the valve parts can be easily and cheaply manufactured and assembled, and further to provide a relatively simple, inexpensive and efficient valve which is constructed so as to reduce to a minimum the tendency of air leakage between the gasket and its seat and between the gasket and the disk which closes the passage way through the tubular valve body.

With the foregoing and other objects in view, our invention consists in certain novel features of construction and arrangement of parts, hereinafter more fully described and claimed, and illustrated in the accompanying drawings, in which—

Figure 1 is a vertical section taken through the center of a valve of my improved construction and showing the disk unseated from the gasket.

Fig. 2 is a sectional view of the lower portion of the valve body and showing the disk in its closed or seated position.

Fig. 3 is a sectional view of the disk and illustrating the means utilized for securing said disk to the valve.

Fig. 4 is a sectional view of the lower portion of a modified form of the valve body.

Referring by numerals to the accompanying drawings which illustrate a practical embodiment of our invention, 10 designates the tubular body of the valve in the lower end of which is screw seated the tubular neck 11 of a disk 12.

Formed in the underside of this disk 12 is an annular groove or recess 13 and formed on the bottom face of this recess is a concentric rib 14. Formed on both side faces of the groove or recess 13 are ribs 15, the same projecting toward each other and formed on the under face of disk 12 at both edges of the recess 13 are relatively short lips or flanges 16, the latter serving as retaining means for a gasket 17 of rubber or analogous material and which occupies the recess 13.

This gasket is necessarily forced into the recess 13 under pressure and when properly positioned therein, the lower corners of said gasket occupy positions beneath or inside of the lips or flanges 16. Extending through the tubular body 10 of the valve is a rod 18 which constitutes a valve stem and carried on the lower end thereof is a disk 19 provided on its edge with an upwardly projecting inverted V-shaped rib or flange 20. The diameter of this rib or flange is slightly greater than the diameter of the rib 14 so that when the disk occupies a closed position, as illustrated in Fig. 2, the upper edge of said rib 20 will occupy a position within the compressed gasket 17 outside and concentric with the lower edge of said rib 14. The disk 19 can be rigidly fixed to the lower end of stem 18 in any suitable manner, but we prefer to thread the lower end of said stem 18 as designated by 21 and screw seat the same in a centrally arranged stud 22 which is formed integral with and projects upwardly from disk 19.

An annular groove 23 is formed in stem 18 at the upper end of the threaded portion 21 and the upper end of the stud 22 is swaged into this groove thereby providing a firm and substantial connection.

The upper portion of stem 18 is threaded as designated by 24 and arranged on said threaded portion is a nut 25. Interposed between this nut and an annular shoulder 26 which is formed within the tubular body 10 is a compression spring 27, the tendency of which is to move stem 18 upwardly through tubular body 10 and force rib 20 on the disk 19 into closed engagement with gasket 17.

A tubular nut 28 is adapted to be applied to the upper end of body 10, said nut being provided with an axially disposed threaded bore 29 which receives the threaded upper end of stem 18. When this nut is properly manipulated, stem 18 and parts carried thereby can be drawn upwardly with respect to the valve body 10, thereby embedding the upper portion of rib or flange 20 in the gasket 17 and thus providing an air tight joint.

It will be noted that rib or flange 20 is substantially of inverted V-shape and when it is moved upwardly and embedded in gasket 17, the latter will be compressed radially in both directions with the result that an air tight joint is produced between the surfaces of the gasket and the walls of the recess 13 and thus the leakage of air past said gasket is effectually prevented.

In some instances, either one or both of the ribs 15 may be dispensed with and likewise the inner one of the lips or flanges 16 may be dispensed with thereby providing a construction as illustrated in Fig. 4.

The formation of disk 12 separately from the tubular body 10 and the formation of disk 19 separately from stem 18 greatly facilitates and cheapens the manufacture of the valve.

A pneumatic valve of our improved construction is comparatively simple, can be easily and cheaply manufactured and is very effective in preventing the leakage of air past the tubes or inflatable members to which it is applied.

It will be readily understood that minor changes in the size, form and construction of the various parts of our improved pneumatic valve may be made and substituted for those herein shown and described without departing from the spirit of our invention, the scope of which is set forth in the appended claims.

We claim:

1. In a pneumatic valve, a tubular body, the lower end of which is provided with an annular recess concentric with the opening through said tubular body, an annular rib on the bottom of said recess, which rib is substantially V-shaped in cross section and disposed concentric with the opening through the tubular body, an elastic gasket set in said recess beyond the outer edge of the opening and in which gasket the rib on the bottom of the recess is embedded, means on the tubular body and projecting into the recess for retaining the gasket therein, a stem passing through the tubular body, a disk on the lower end thereof, an annular rib projecting upwardly from the edge of said disk, said rib being substantially of inverted V-shape in cross section and the diameter of said rib being greater than the diameter of the annular rib that is formed on the bottom of the recess, and a spring cooperating with said stem for drawing the disk into engagement with the lower end of the tubular body and embedding the rib on said disk in the elastic gasket.

2. In a pneumatic valve, a tubular body, the lower end of which is provided with an annular recess that is concentric with the opening through the valve body, an annular rib formed on the bottom of said recess, which rib is substantially V-shaped in cross section, ribs projecting from the side walls of the recess, an elastic gasket set in said recess so that the outer face of the opening is beyond the outer face of the gasket and in which the ribs in said recess are embedded, lips on the lower end of the tubular body for retaining the gasket in said recess, a stem passing through the tubular body, a disk on the lower end of said stem, and a rib formed on said disk adjacent to its edge, which rib is substantially of inverted V-shape in cross section and is greater in diameter than the diameter of the rib on the bottom of the recess.

In testimony whereof we hereunto affix our signatures, this 28th day of December, 1918.

JOSEPH N. NEWSOM.
HARRY E. HARDER.
WILLIAM F. LESCHEN.